(No Model.)
C. O. HARRIS.
MACHINE FOR THE MANUFACTURE OF SCREW CUTTING DIES.
No. 500,494. Patented June 27, 1893.
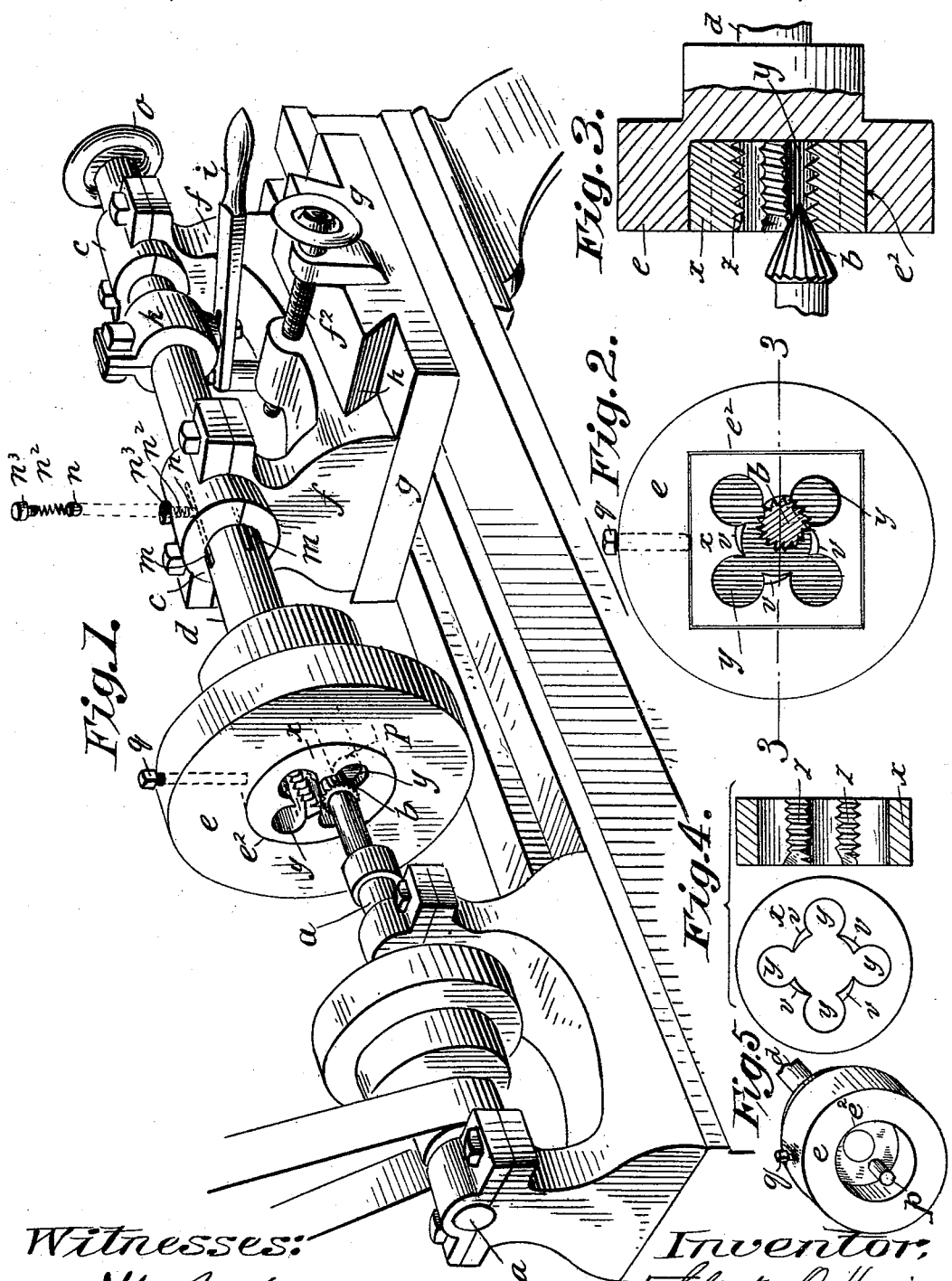

UNITED STATES PATENT OFFICE.

CLINTON O. HARRIS, OF CHICOPEE FALLS, MASSACHUSETTS, ASSIGNOR OF ONE-HALF TO LEONARD W. BEMIS, OF SAME PLACE.

MACHINE FOR THE MANUFACTURE OF SCREW-CUTTING DIES.

SPECIFICATION forming part of Letters Patent No. 500,494, dated June 27, 1893.

Application filed August 1, 1892. Serial No. 441,796. (No model.)

*To all whom it may concern:*

Be it known that I, CLINTON O. HARRIS, a citizen of the United States, residing at Chicopee Falls, in the county of Hampden and State of Massachusetts, have invented new and useful Improvements in the Manufacture of Screw-Cutting Dies, of which the following is a specification.

This invention relates to improvements in machines for the manufacture of screw cutting dies, especially relating to the back cutting or "backing off" of the initial teeth of the die which is common and necessary for clearance.

The invention consists in means for effecting the back cutting, all substantially as will hereinafter fully appear and be set forth in the claims.

The following description will be rendered clear by the accompanying drawings, in which—

Figure 1 is a perspective view of a machine for carrying out the invention, the operation upon the die being shown. Fig. 2 is a view of a holder for a square die block, the teeth of the die being shown as backed off, the position of the back cutting mill being indicated relative to one series of the cutting teeth. Fig. 3 is a sectional view taken on the line 3—3, Fig. 2. Fig. 4 is a face view and projected central section of a screw cutting die formed within a round die block with the initial teeth "back-cut." Fig. 5 is a perspective view of the die-holding device shown on the machine illustrated in Fig. 1.

The well known screw die comprises a suitable body or block with a central opening therethrough having the segments of internal screw threads which constitute the screw cutting or die teeth, they being arranged in series as shown, and the initial or outermost one or two teeth of each series is backed off or reduced from the forward cutting corner, as seen at $v$, for clearance and to permit the cutter to come to its action upon the shaft or rod being screw cut. Heretofore, so far as known to me, this back-cutting has been performed by hand filing, a slow and tedious process, and one by which the uniformity of the reduction at the rear of the teeth has not been usually attained. Therefore in carrying out the invention I provide a suitably driven spindle, $a$, having attached to one end thereof a mill-cutter, $b$, of conical form. Another shaft, $d$, is comprised in the improved machine which has on its end toward the mill-cutter a die-holding device, $e$. This spindle is mounted in the journals, $c, c$, of a tail-stock, $f$. The tail-stock is transversely movable on the supporting block, $g$, therefor having the dove-tail engagement therewith, seen at $h$, and the transverse movements may be imparted and nicely gaged by the screw, $f^2$, having the handwheel, said screw being engaged with the ear-piece of the block, $g$, to freely rotate therein without axial movement, and having a screw engagement with the tail-stock. The shaft, $d$, mounted in the journal blocks of the tail-stock is adapted for a longitudinal movement, the same being imparted by the lever, $i$, which is pivoted on the fixed stud, $j$, and has a pin and slot engagement with the collar, $k$, on the shaft. The shaft has, at its portion which is fitted within one of the journal bearings, a series of longitudinal grooves, $m$, equal in number and in a corresponding relative arrangement to the series of segmental cutter teeth, $z$, in the die to be worked upon. A hole is formed through the top of the journal into which is loosely placed a small stud, $n$, having a rounded lower end, above which is a spring, $n^2$, held for a downward reaction by the screw plug, $n^3$. The hand wheel, $o$, constitutes a convenient means for effecting the rotational movements of the shaft.

The holder device, $e$, for the die, here shown, consists of a cylindrical block formed or attached on the shaft with a round or square socket, $e^2$, therein into which the round or square die-body fits. Within the socket, a gage-stud, $p$, is preferably fixed to engage one of the throat apertures, $y$, of the die to prevent it from turning in the holder, one of such apertures being formed between every two series, $z$, of the die teeth; a set-screw, $q$, holds the die firmly in place in the holder. Said gage stud, however, is not required when the die is of rectangular form, as in Fig. 2.

Now the operation of the machine and method of performing the back-cutting consists,—after the tail-stock has been properly laterally adjusted to be in the proper offside line from the axis of the mill, so that the latter will come to work at the right place on the initial or outer teeth of a series of the die teeth,—in forcing the shaft, by the lever, $i$, forwardly carrying the die sufficiently far against the mill cutter as to give the desired depth of the back cut. It will be understood that the parts are so adjusted and manipulated that the reduction by the mill cutter is in a curved course corresponding to the circular shape of the cutter which begins at the inwardly prominent edge of the initial cutting tooth and extends outwardly and rearwardly therefrom, the line, $v$, in Figs. 2 and 4 indicating the boundary, at the forward face of the die, of the back-cut. The depth of this back-cut may be as great as desired and determined by the degree of inclination which the sides of the cutter have to its axis. Having backed off the initial tooth or teeth of one of the series, the shaft is withdrawn endwise to bring the die free from the cutter, when, by the handwheel, $o$, the shaft, $d$, is rotated until the snap catch, $n$, springs into the next properly spaced groove, $m$, when the shaft is again endwise moved to force the edge of the forward tooth of the next series against the mill cutter. These operations are repeated as many times as there are series of teeth in the die-cutter and then the latter is removed from the holder. It is obvious that the result would be the same were the spindle, $a$, which carries the cutter, $b$, made to slide in its bearings to move said cutter to and from the die, and the spindle, $d$, be permitted to turn but not to slide, and the die, or die-holder and die be simply turned to bring the points of the die to be milled, in proper position, successively, for the cutter to act thereupon.

I claim—

1. The combination with the cone-shaped rotary mill-cutter and a spindle for operating the same, of the tail-stock having the shaft, $d$, mounted to slide endwise and having the longitudinal grooves, $m$, therein, and carrying at its end toward the mill cutter, a holder for the die to be operated upon, said tail-stock being mounted for a movement transversely relative to the axis of the mill-cutter and having the pivoted lever, $i$, thereon, for forcing the shaft endwise, the stud, $n$, engaging in either of said grooves, and the screw, $g$, for moving said shaft transversely of the axis of the cutter while the latter is operating upon the die, substantially as set forth.

2. The combination with the rotary mill cutter of a shaft mounted for a rotational movement with its end near the said cutter, and the one being adjustable laterally relative to the other, and the said shaft having a die-holding device with a socket therein, for the reception of the die, and the gage-pin, $p$, and said shaft adapted for rotational movements for successively bringing different series of the die-teeth to the action of the mill cutter.

3. The combination with the spindle, $a$, having the mill cutter, $b$, of the shaft, $d$, set in offset bearings from said spindle and having the longitudinal grooves, $m$, $m$, and carrying the die holding device which comprises a socketed part with the gage-pin, $p$, the snap catch applied at the bearing of the shaft and adapted to engage said grooves and means for moving the shaft endwise, substantially as described.

4. The combination with the spindle, $a$, having the conical mill cutter, $b$, of the block, $g$, and the tail-stock having the transverse dove-tail engagement therewith, and provided with the bearings, $c$, $c$, offset from the axis of the mill cutter, the shaft, $d$, having the collar, $k$, and the socketed holder $e$, with the gage-pin, $p$, and the longitudinal grooves, $m$, $m$, the screw, $f^2$, supported for rotation on the block, $g$, and screw engaging the tail-stock, and the lever, $i$, pivotally mounted on the tail-stock and having an engagement with the said collar, $k$, all substantially as described.

CLINTON O. HARRIS.

Witnesses:
H. A. CHAPIN,
L. W. BEMIS.